US012567039B2

(12) United States Patent
Eidelwein et al.

(10) Patent No.: US 12,567,039 B2
(45) Date of Patent: Mar. 3, 2026

(54) PATH PROJECTOR RESPONSIVE TO EMBEDDED DATA

(71) Applicant: ADP, INC., Roseland, NJ (US)

(72) Inventors: Leandro Eidelwein, Porto Alegre (BR);
Bruna Gouveia, Porto Alegre (BR);
Rafael Gomes, Porto Alegre (BR);
Roberto Dias, Sao Paulo (BR); **Andre
Mendes, Porto Alegre (BR); Eduardo
Hoefel**, Porto Alegre (BR)

(73) Assignee: ADP, Inc., Roseland, NJ (US)

( * ) Notice: Subject to any disclaimer, the term of this
patent is extended or adjusted under 35
U.S.C. 154(b) by 790 days.

(21) Appl. No.: 16/380,363

(22) Filed: Apr. 10, 2019

(65) Prior Publication Data

US 2020/0327504 A1     Oct. 15, 2020

(51) Int. Cl.
*G06N 20/00*          (2019.01)
*G06Q 10/1053*        (2023.01)

(52) U.S. Cl.
CPC ......... *G06Q 10/1053* (2013.01); *G06N 20/00*
(2019.01)

(58) Field of Classification Search
CPC ........................... G06Q 10/1053; G06N 20/00
USPC ......................................................... 705/321
See application file for complete search history.

(56) References Cited

U.S. PATENT DOCUMENTS 6,675,164 B2 *   1/2004   Kamath ............... G06K 9/6282
7,555,441 B2 *   6/2009   Crow ................. G06Q 10/0631
                                                            705/7.14

10,565,561 B2 *   2/2020   Goel ...................... G06Q 50/01
2011/0313940 A1 *  12/2011   Kerr ....................... G06Q 10/10
                                                            705/321
2012/0226623 A1 *   9/2012   Jurney ................... G06Q 50/01
                                                            705/321

(Continued)

OTHER PUBLICATIONS

A. Gugnani, V. K. Reddy Kasireddy and K. Ponnalagu, "Generating
Unified Candidate Skill Graph for Career Path Recommendation,"
2018 IEEE International Conference on Data Mining Workshops
(ICDMW), 2018, pp. 328-333, doi: 10.1109/ICDMW.2018.00054.
(Year: 2018).*

(Continued)

*Primary Examiner* — Laura Yesildag
(74) *Attorney, Agent, or Firm* — Foley & Lardner LLP

(57)          ABSTRACT

Aspects map values of skills data for candidates to skills
metadata representations stored within a metadata repository
that includes skills metadata representation data dimensions
for other candidates; filter via machine learning a top-
trending subset of job classifications that have better career
opportunity values from a universe of job classifications
defined within the repository dimensional data values; deter-
mine via machine learning career path viability values for
the top-trending subset job classifications as a function of
strength of match to candidate dimensional values; project
likely future values of mapped candidate values at the end of
a future time period within a simulated work market sce-
nario; and prioritize the top-trending subset job classifica-
tions as potential career paths for candidates as a function of
the career path viability values and the projected future
values of the dimensional data mapped for the candidates
within the repository.

6 Claims, 3 Drawing Sheets

(56) References Cited

U.S. PATENT DOCUMENTS

| | | | |
|---|---|---|---|
| 2013/0218619 A1* | 8/2013 | Friedlander .... | G06Q 10/063112 |
| | | | 705/7.14 |
| 2014/0244532 A1* | 8/2014 | Budzienski ........ | G06Q 10/1053 |
| | | | 705/321 |
| 2014/0279632 A1* | 9/2014 | Andersen .......... | G06Q 10/1053 |
| | | | 705/321 |
| 2015/0046356 A1* | 2/2015 | Millmore .......... | G06Q 10/1053 |
| | | | 705/321 |
| 2017/0154307 A1* | 6/2017 | Maurya .............. | G06F 16/9535 |
| 2017/0236095 A1* | 8/2017 | Schreiber ............. | G06F 3/0482 |
| | | | 705/321 |
| 2018/0039946 A1* | 2/2018 | Bolte ................. | G06Q 50/2057 |
| 2018/0211343 A1* | 7/2018 | Angus ............... | G06Q 50/2057 |
| 2018/0218330 A1* | 8/2018 | Kadambala ...... | G06Q 10/06398 |
| 2018/0232751 A1* | 8/2018 | Terhark ................. | G06N 7/005 |
| 2018/0285823 A1* | 10/2018 | Kenthapadi ........... | G06Q 50/01 |
| 2018/0285824 A1* | 10/2018 | Kenthapadi ........... | G06Q 50/01 |
| 2019/0042646 A1* | 2/2019 | Hoang .............. | G06Q 30/0201 |
| 2019/0180214 A1* | 6/2019 | Fearn ............. | G06Q 10/06398 |
| 2019/0197486 A1* | 6/2019 | Jersin ................... | H04L 67/306 |
| 2019/0258984 A1* | 8/2019 | Rehman ................. | G06N 7/005 |
| 2019/0259002 A1* | 8/2019 | Balasia .............. | G06Q 10/1053 |
| 2020/0019595 A1* | 1/2020 | Azua Garcia ......... | G06T 11/206 |
| 2020/0065772 A1* | 2/2020 | Whitehead ......... | G06Q 10/1053 |

OTHER PUBLICATIONS

L. Mostafa and A. M. Elbarawy, "Enhance Job Candidate Learning Path using Gamification," 2018 28th International Conference on Computer Theory and Applications (ICCTA), Alexandria, Egypt, 2018, pp. 88-93, doi: 10.1109/ICCTA45985.2018.9499189. (Year: 2018).*

Minnesota State Careerwise Education, Career Pathways, 2019, https://careerwise.minnstate.edu/careers/pathways.html, entire document.

Melanie Pinola, Top 10 Ways to Find Your Career Path, Lifehacker, 2019, https://lifehacker.com/top-10-ways-to-find-your-career-path-1628537579, entire document.

Daily Muse Inc., The Easiest Way to Find Your Ideal Career Path, 2019, https://www.themuse.com/advice/the-easiest-way-to-find-your-ideal-career-path, entire document.

* cited by examiner

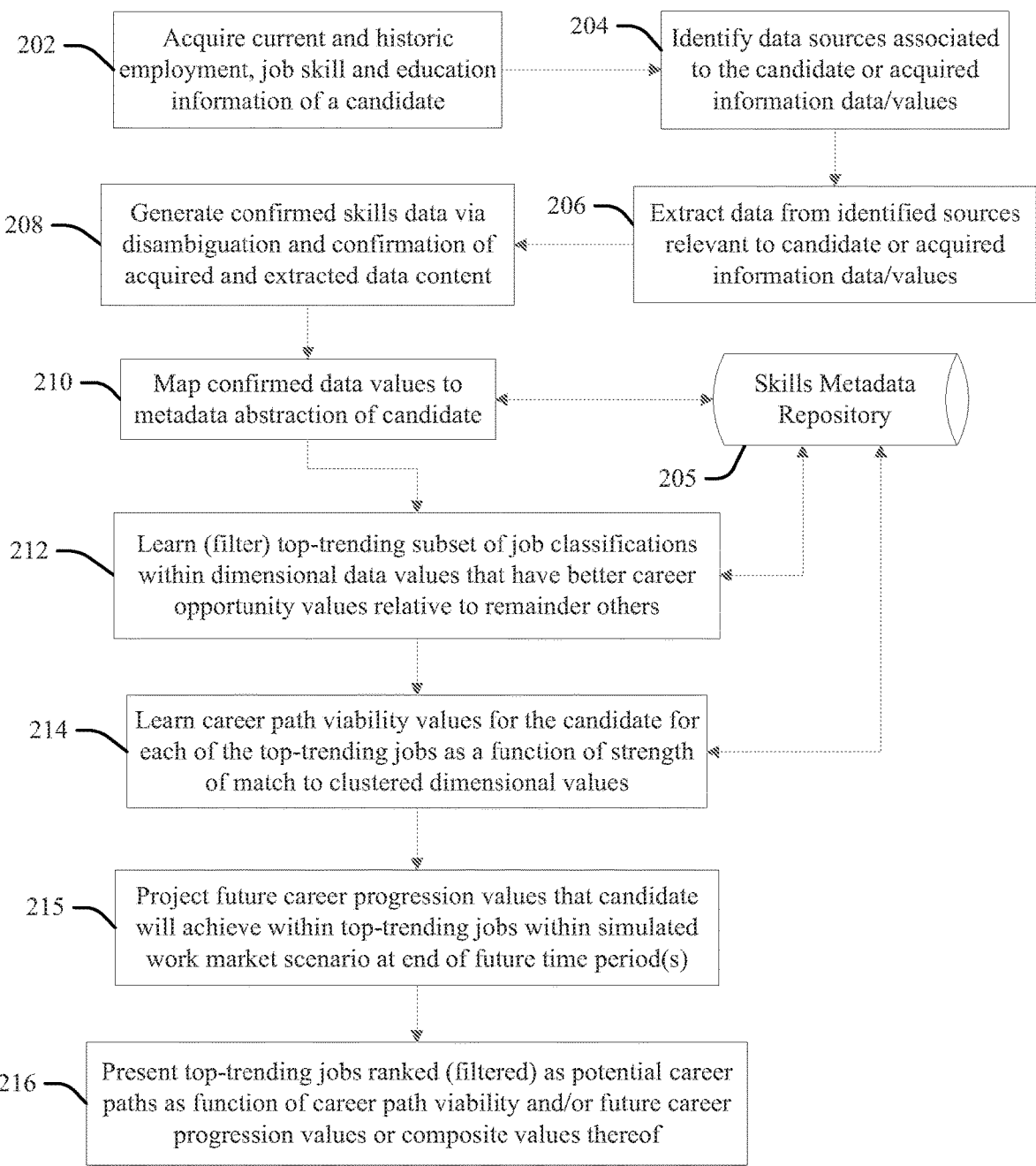

202 — Acquire current and historic employment, job skill and education information of a candidate 204 — Identify data sources associated to the candidate or acquired information data/values 208 — Generate confirmed skills data via disambiguation and confirmation of acquired and extracted data content 206 — Extract data from identified sources relevant to candidate or acquired information data/values 210 — Map confirmed data values to metadata abstraction of candidate Skills Metadata Repository

205 —

212 — Learn (filter) top-trending subset of job classifications within dimensional data values that have better career opportunity values relative to remainder others 214 — Learn career path viability values for the candidate for each of the top-trending jobs as a function of strength of match to clustered dimensional values 215 — Project future career progression values that candidate will achieve within top-trending jobs within simulated work market scenario at end of future time period(s)

216 — Present top-trending jobs ranked (filtered) as potential career paths as function of career path viability and/or future career progression values or composite values thereof

FIG 1

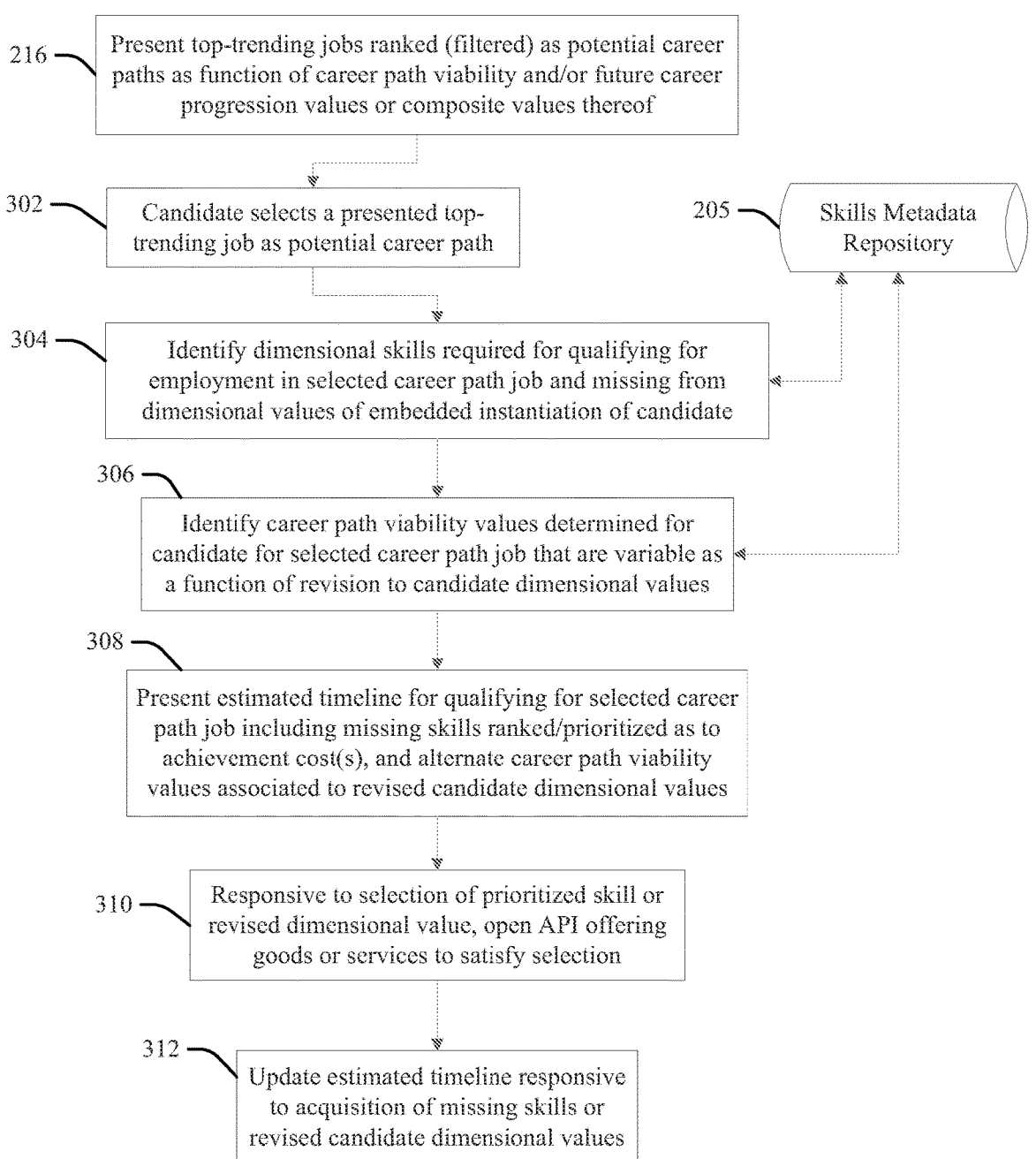

216 — Present top-trending jobs ranked (filtered) as potential career paths as function of career path viability and/or future career progression values or composite values thereof 302 — Candidate selects a presented top-trending job as potential career path 205 — Skills Metadata Repository 304 — Identify dimensional skills required for qualifying for employment in selected career path job and missing from dimensional values of embedded instantiation of candidate 306 — Identify career path viability values determined for candidate for selected career path job that are variable as a function of revision to candidate dimensional values 308 — Present estimated timeline for qualifying for selected career path job including missing skills ranked/prioritized as to achievement cost(s), and alternate career path viability values associated to revised candidate dimensional values 310 — Responsive to selection of prioritized skill or revised dimensional value, open API offering goods or services to satisfy selection 312 — Update estimated timeline responsive to acquisition of missing skills or revised candidate dimensional values

FIG 2

PATH PROJECTOR RESPONSIVE TO EMBEDDED DATA

BACKGROUND

Human resource management (sometimes "HRM" or "HR") generally refers to functions and systems deployed in organizations that are designed to facilitate or improve employee, member or participant performance in service of an organization or employer's strategic objectives. HR comprehends how people are identified, categorized and managed within organizations via a variety of policies and systems. Human Resource management systems may span different organization departments and units with distinguished activity responsibilities: examples include employee retention, recruitment, training and development, performance appraisal, managing pay and benefits, and observing and defining regulations arising from collective bargaining and governmental laws. Human Resource Information Systems (HRIS) comprehend information technology (IT) systems and processes configured and utilized in the service of HR, and HR data processing systems which integrate and manage information from a variety of different applications and databases.

SUMMARY

In one aspect of the present invention, a method includes a processor mapping values of skills data for a first candidate to a skills metadata representation of the first candidate that includes a plurality of data dimensions that are stored within a metadata repository, wherein the metadata repository comprises skills metadata representation data dimensions for each of a plurality of candidates inclusive of the first candidate; filtering via a machine learning process a top-trending subset of job classifications from a larger plurality of universe of job classifications that are each defined within dimensional data values of a skills metadata repository as a function of determining as a function of employment data that the top-trending subset job classifications have better career opportunity values relative to remainder other ones of the job classifications; determining via a machine learning process a plurality of career path viability values, one for each of the top-trending subset job classifications, as a function of strength of match of the values mapped for the first candidate to dimensional values within the repository of each of the top-trending subset of job classifications; projecting likely future values of the values mapped for the first candidate within the repository that the candidate will achieve within each of the top-trending subset job classifications at the end of a future time period within a simulated work market scenario; and prioritizing the top-trending subset job classifications as potential career paths for the first candidate as function of the career path viability values and the projected future values of the dimensional data mapped for the first candidate within the repository.

In another aspect, a system has a hardware processor in circuit communication with a computer readable memory and a computer-readable storage medium having program instructions stored thereon. The processor executes the program instructions stored on the computer-readable storage medium via the computer readable memory and thereby maps values of skills data for a first candidate to a skills metadata representation of the first candidate that includes a plurality of data dimensions that are stored within a metadata repository, wherein the metadata repository comprises skills metadata representation data dimensions for each of a plurality of candidates inclusive of the first candidate; filters via a machine learning process a top-trending subset of job classifications from a larger plurality of universe of job classifications that are each defined within dimensional data values of a skills metadata repository as a function of determining as a function of employment data that the top-trending subset job classifications have better career opportunity values relative to remainder other ones of the job classifications; determines via a machine learning process a plurality of career path viability values, one for each of the top-trending subset job classifications, as a function of strength of match of the values mapped for the first candidate to dimensional values within the repository of each of the top-trending subset of job classifications; projects likely future values of the values mapped for the first candidate within the repository that the candidate will achieve within each of the top-trending subset job classifications at the end of a future time period within a simulated work market scenario; and prioritizes the top-trending subset job classifications as potential career paths for the first candidate as function of the career path viability values and the projected future values of the dimensional data mapped for the first candidate within the repository.

In another aspect, a computer program product has a computer-readable storage medium with computer readable program code embodied therewith. The computer readable program code includes instructions for execution which cause the processor to map values of skills data for a first candidate to a skills metadata representation of the first candidate that includes a plurality of data dimensions that are stored within a metadata repository, wherein the metadata repository comprises skills metadata representation data dimensions for each of a plurality of candidates inclusive of the first candidate; filter via a machine learning process a top-trending subset of job classifications from a larger plurality of universe of job classifications that are each defined within dimensional data values of a skills metadata repository as a function of determining as a function of employment data that the top-trending subset job classifications have better career opportunity values relative to remainder other ones of the job classifications; determine via a machine learning process a plurality of career path viability values, one for each of the top-trending subset job classifications, as a function of strength of match of the values mapped for the first candidate to dimensional values within the repository of each of the top-trending subset of job classifications; project likely future values of the values mapped for the first candidate within the repository that the candidate will achieve within each of the top-trending subset job classifications at the end of a future time period within a simulated work market scenario; and prioritize the top-trending subset job classifications as potential career paths for the first candidate as function of the career path viability values and the projected future values of the dimensional data mapped for the first candidate within the repository.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 1 is a flow chart illustration of a method or process aspect according to an embodiment of the present invention.

FIG. 2 is a flow chart illustration of another method or process aspect according to an embodiment of the present invention.

DETAILED DESCRIPTION

Figure 3:
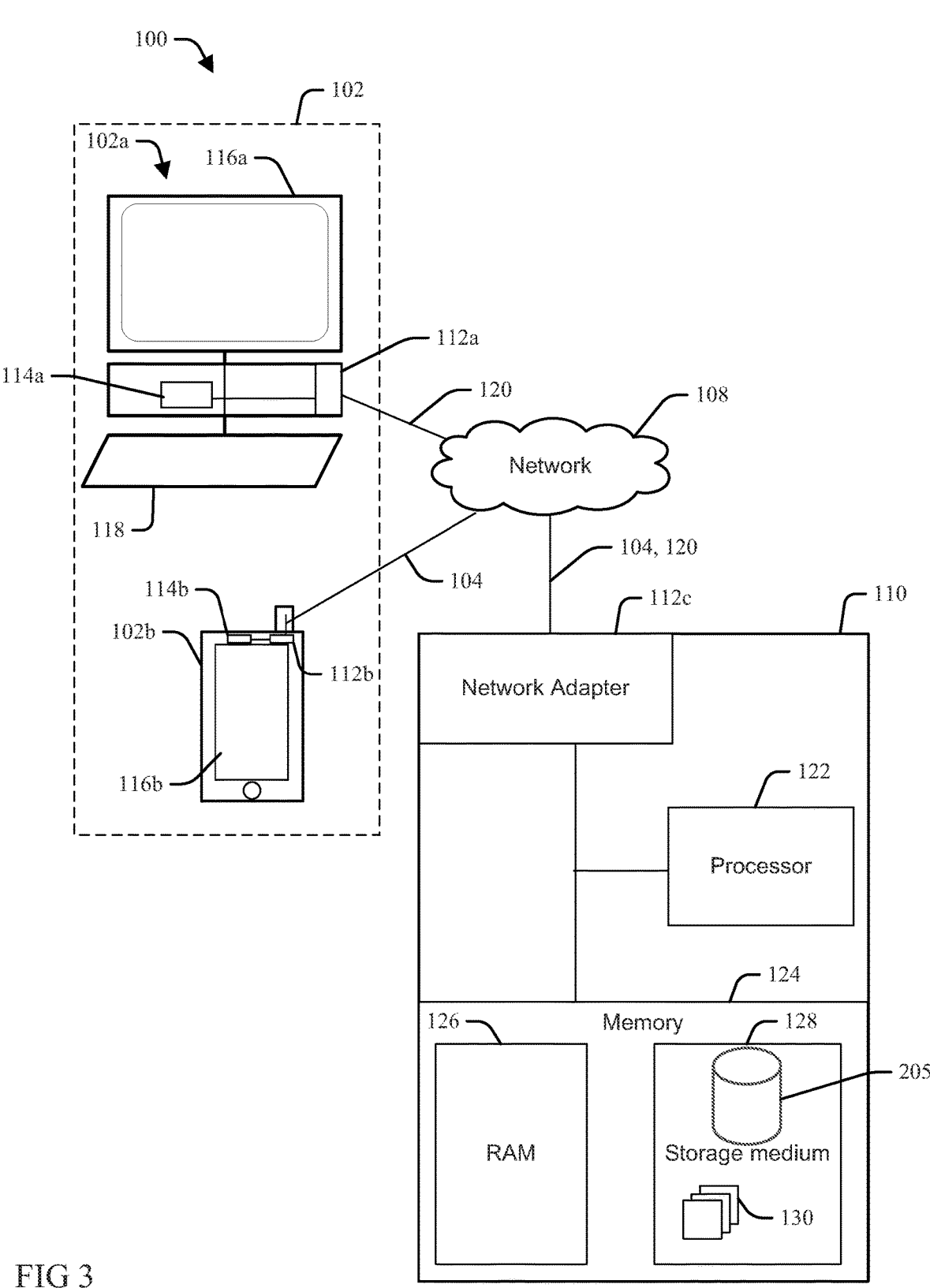
FIG. 3 is a graphic illustration of an example of another implementation according to an embodiment of the present invention.

It is difficult to utilize conventional HR career planning services or processes to define a next steps towards a career progression, in part as they generally require a user to choose between possible career paths based on the user's perception of the current and future marketplace demands gleaned from discussions with advisors, colleagues, coworkers, friends and family, educational course availability, etc. As such perceptions are generally shaped from knowledge of current, specific peak demands, future extrapolations are commonly formulated by making an informed determination as to whether and how the demands will likely change over time.

Additionally, it is difficult under conventional HR career planning services to reliably recognize or project desirable career change possibilities from the current professional status and skill set of a user (candidate). Deciding to make a career change based on incomplete data creates anxiety and worry, which may prevent a user from leaving a comfort zone associated with staying in a current career path, and thereby frustrate or prevent the user from developing a better career through changing jobs or career paths.

Conventional HR career planning services may fail to offer consistent levels of service, quality or accuracy with respect to projecting future employment demands and salary levels across different technical fields, in part due to inequalities in availability or quality of relevant employment data or business intelligence or across differing career areas. Some projections tied to newer career paths may be overly focused on data acquired from new hires, resulting in projections that are inherently less reliable relative to those of more mature career paths that have more data acquired over longer timeframes (reflecting more comprehensive trends over a greater variety of economic contexts). Other careers may present less amounts of data to consider, for example, due to more limited public data availability, and the reliability the acquired data or knowledge may also vary across different career domains. Due to such data inequalities conventional HR career planning services may project some future career demands on insufficient, incorrect or untrustworthy data, wherein the risks of faulty projections are proportionate to the weight that such deficient data is considered in generating the projections.

Deficiencies in accurately projecting viable, better, alternative career paths across competing options may also result in incurring significant costs within career coaching systems and processes, for example, requiring additional research resource cost expenditures to harmonize unequal business data or intelligence with respect to different career paths, or resulting in losses from termination of service contracts due to poor performance caused by such deficiencies.

Aspects of the present invention provide advantages over conventional HR career planning services and processes, systems and processes in solving the problems discussed above. FIG. 1 illustrates a method or process embodiment of the present invention for an automated and autonomous career path projector responsive to embedded candidate data. At 202 a processor configured according to the present invention (the "configured processor") acquires current and historic employment, job skills and education information (schools attended, degrees conferred, grade point averages, class rank, etc.) of a candidate (organization employee, prospective employee, intern, student, independent contractor, etc.); for example, in response to a question-and-answer form or template displayed or provided to the candidate.

At 204 the configured processor identifies data sources that are relevant or associated to the candidate or to the current and historic employment, job skills and education information data and values acquired at 202, and at 206 extracts additional data from the identified sources that is relevant or associated to the candidate or to the current and historic employment, job skills and education information data and values acquired at 202. A wide variety of data sources may be identified at 204, and the additional data extracted therefrom at 206, and illustrative but not exhaustive examples include:

(i.) Text content extracted via performing optical character recognition (OCR) processing on printed resume documents, cover letters, candidate application paperwork and other image information identified at 204 as relevant or associated to the candidate the data and values acquired at 202.

(ii.) Data extracted from social media services, such as changes to marital status, domicile, residence, nationality, visa status, job, education or employer information extracted from postings by the candidate or social connections to Facebook®, Instagram®, LinkedIn® or other social and professional networking media services linked to the candidate at 204 (FACEBOOK and INSTAGRAM are trademarks of Facebook, Inc. in the United States or other countries; LINKEDIN is a trademark of LinkedIn Corp. in the United States or other countries). For example, the configured processor may perform image analysis at 206 of a picture posted in a social media account of a friend of the candidate identified at 204 wherein the candidate is tagged and thereby determine (via comparison to labelled images, or fitting image data masques, etc.) that the candidate is wearing a graduation robe, which when considered in view of text content associated with the image processed via Natural Language Processing (NLP) techniques ("Big State University graduation, so proud!") results in a determination that the candidate has likely earned additional education credentials, which further triggers a search for the name of the candidate within a publication of Big State University of the date of the metadata of the image or posting that lists the names of graduates and their awarded degrees and honors, which results in a determination that the candidate has earned a Masters of Science degree in Electrical Engineering with Honors from Big State University on said date.

(iii.) Data extracted from text content of standardized testing services, newsfeeds, governmental records, credit report agency records, insurance company records, or other external public and/or private sources determined at 204 as relevant or associated to the candidate the data and values acquired at 202. For example, test scores of the candidate from Advanced Placement (AP), American College Testing (ACT), Scholastic Assessment Test (SAT), Graduate Record Examinations (GRE), Law School Aptitude test (LSAT), Medical College Admission Test (MCAT), Intelligence Quotient (IQ) or a other standardized intelligence or proficiency tests may be retrieved from public or private records, including via obtaining consent from the candidate; the weather and climate data for residence, work and travel locations of the candidate; employment-related news and announcements, for example, construction of new headquarters in one location, or closure of offices in another location, projected new hires and job categories, etc.; and new regional tax locations, exemptions, visa programs, etc., within specific geographic regions identified at 204 as relevant or associated to the candidate or to the employment titles and data values of the candidate acquired at 202.

(iv.) Mobile device data: this is data and metadata extracted from the cell phone, tablet or other personal mobile programmable device of the candidate, including operating system and current and historic geolocation data.

At 208 the configured processor executes disambiguation and other data confirmation processes on the acquired and extracted text content data to generate confirmed candidate skills data, generally by selecting (most likely) semantic meanings of the extracted text content from plurality of possible meanings of word content as a function of context. Disambiguation at 208 may comprehend natural language processing sentence boundary disambiguation (deciding where text string sentences begin and end), syntactic disambiguation, semantic disambiguation, and still others will be apparent to one skilled in the art.

At 210 the configured processor maps or embeds the confirmed skills data values to a metadata abstraction or representation of the candidate stored (embedded) within a Skills Metadata Repository 205. The mapping (embedding) at 210 generally de-normalizes the data information into a plurality of data dimensions that define a skills meta representation (embedded instantiation) of the candidate. Mapping at 210 may transform a data element (salary, date of hire, etc.) that varies by data values, type or format across different employees, or organizations or departments, into a uniform, structured data of a specified or common value, data type or format.

Illustrative but not limiting or exhaustive examples of processes or systems applied at 210 include a include a Job Title Classifier that outputs a single, common job classification code "SOC (15-1133.00—Software Developers" for inputs of each of plurality of different employee job titles or defined duties, skills or functions of the employees, including a text string content derivative descriptions of "Hadoop engineer" and "Machine learning engineer," etc., thereby resolving different input values to a same, common job title code. Further, an "Employee-type Clusterer" may identify type values for employee by finding commonalities across job title, duties, task, etc.: for example, a plurality of employees may be labeled (or assigned) an "Accounts receivable Services" type in response to determining that they each have duties that include the receipt and approval of payments from vendors or consumers. Still other examples will be apparent to one skilled in the art.

At 212 the configured processor, via a machine learning process, identifies determines, filters or otherwise learns a top-trending subset of a universe of job classifications that are defined (present) within the dimensional data values of the Skills Metadata Repository 205 and that have best or better career opportunity values (salary, job title advancement opportunities, etc.) relative to other (remainder) ones of the job classifications defined (present) within the dimensional data values, as a function of current and historic employment data. For example, the configured processor includes "software architects", "software engineer" and "Hadoop system manager" job titles into the trending subject at 212 in response to learning that they each have lower vacancy or employment rates, or have higher percentages of annual salary increase, relative to remainder job titles including "computer programmer," "information technology analyst" and "Java® system technician" job titles (and wherein the configured processor responsive removes, drops or elides said remainder job titles from the trending subset, in the event they had been added to the trending subject in a previous iteration). (JAVA is a trademark of Oracle America, Inc., in the United States or other countries.)

In some embodiments machine learning processes comprehend executing multi-agent artificial intelligence (AI) processes comprising parallel executions of a plurality of deep-learning machine learning algorithms (for example, big-data preprocessing and classification, topic modeling, clustering, regression and classification, etc.) in order to cluster and categorize dimensional values associated to job descriptions that are relevant to salary and career opportunity values, and thereby associated to trending behavior of the top-trending jobs.

Thus, by filtering a universe of possible job descriptions into a "top-trending" subject grouping at 212, embodiments provide resource efficiencies over conventional systems, wherein only the top-trending job opportunities are considered to define career paths as discussed below, rather than wasting resources, or ultimately suggesting to a user, a career path leading to a job description that is not within this selective subject, and by definition not have good employability, career or salary growth values in current market data represented within (or learned from) the repository 205 dimensional values relative to the top-trending subset options.

At 214 the configured processor determines (via machine learning processes) career path viability values for each of the top-trending jobs as a function of strength of match (clustering) of dimensional values embedded (instantiated) for the candidate within the repository 205 to those of the top-trending jobs grouping. Data value comparisons at 214 may comprehend extraction of technology skills and aptitudes from educational credentials, standardized text values and work experiences dimensions, including via semantic parsing processes, and wherein the viability values may incorporate strength-of-match of candidate skills dimension values to top or most-common skills of the top-trending jobs as grouped by position similarities.

The career path viability values determined at 214 define objective values for correlation of the top-trending jobs to the candidate skill set, each reflecting strength of match to current candidate skills and likelihood that the candidate will be able to acquire any missing required skills, experience, etc. For example, while the candidate may have and work experience and aptitude test scores that match some of the dimensions for a first of the top-trending job positions, the candidate may also need to acquire post-graduate educational credentials to switch from a current job to said first job that are unlikely to be obtained (below a minimum threshold of occurrence or correlation) for all candidates sharing (clustered by common) dimensional values of total years employed and ratio of combined salary and retirement income to residential debt service or monthly household expenses, etc. Accordingly, the career path viability value set or learned for the first job is generally lower that a value set for another (second) of the top-trending jobs for which any additional, missing requirements are more likely to be timely achieved by the candidate.

At 215 the configured processor projects future career progression values (salaries, job titles, etc.) that the candidate will (likely, probably) achieve within each of the respective top-trending jobs or careers at the end of one or more future time periods (for example, one year, 5 years, 10 years, etc.) within a simulated work market scenario as a function of their current dimensional data.

In some embodiments the configured processor projects future career progression values for the candidate at 215 as a function of "digital twin" replicas of the candidate that are determined or projected from the candidate dimensional data values within the repository 205. A digital twin representation replicates both the candidate dimensional data values and estimations of how they will dynamically change over the future time periods as a function of predicted employment behaviors and life cycles: for example, new, revised or additional experiences or skills values that the candidate will likely acquire over the respective future time periods, identified and adjusted based on comparing and clustering the candidate dimensional data with other candidate data.

In some embodiments digital twin replica values are determined for the candidate at 215 as a function of candidate clustering, including via Principal Component Analysis (PCA) or T-distributed Stochastic Neighbor Embedding (t-SNE) dimensionality reduction. Principal Component Analysis is a statistical procedure that uses an orthogonal transformation to convert a set of observations of possibly correlated variables (entities each of which takes on various numerical values) into a set of values of linearly uncorrelated variables called principal components. T-distributed Stochastic Neighbor Embedding is a nonlinear machine learning process that models each high-dimensional object by a two- or three-dimensional point in such a way that similar objects are modeled by nearby points and dissimilar objects are modeled by distant points with high probability.

Embodiments also project future career progression values for the candidate at 215 as a function of clustering embedding processes, and illustrative but not limiting or exhaustive examples include "density-based spatial clustering of applications with noise" (DBSCAN), "k-nearest neighbors" (k-NN) and "ordering points to identify the clustering structure" (OPTICS) processes. DBSCAN is a density-based data clustering process wherein given a set of points in some space, DBSCAN groups together points that are closely packed together (points with many nearby neighbors), marking as outliers points that lie alone in low-density regions (whose nearest neighbors are too far away). OPTICS is a process for finding density-based clusters in spatial data that provides advantages over DBSCAN in detecting meaningful clusters in data of varying density, wherein points of a database are (linearly) ordered such that spatially closest points become neighbors in the ordering, and a special distance is stored for each point that represents the density that must be accepted for a cluster so that both points belong to the same cluster. The k-nearest neighbors (k-NN) process is a non-parametric pattern recognition method used for classification and regression: in both cases an input consists of the k-closest training examples in a feature space, wherein the output depends on whether the process is used for classification or regression. Still other clustering processes appropriate for practicing with the present invention will be apparent to one skilled in the art.

At 216 the configured processor presents the top-trending jobs ranked (filtered) as potential career paths as a function of the career path viability and/or future career progression values or composite values thereof. The ranking or filtering may focus on one of the career path viability and future career progression values, or use some composite value determined therefrom, including wherein one is weighted more heavily than the other.

Embodiments may display differentiated clusters of groupings at 216, for example, designating one or more clusters that have requirements close (or closest) to a current career path of the candidate, signifying that the candidate meets a threshold percentage or other value of the necessary skills to switch to that career now, or within a reasonable threshold time period related to the missing skills: thus, if the candidate requires additional skills, that they may be obtained within different time periods (three years, five years, 10 years, etc.), including as differentiated within the presentation at 216.

In one embodiment the configured processor drives a graphic user interface (GUI) display at 216 to present differentiated representations of preferential groupings of the top-trending jobs, as follows:

(a.) the top-trending jobs having career path viability and/or future career progression values or some composite value determined therefrom within a top third of all determined values are displayed in a distinctive format or grouping relative to the remainder others, set aside in a most-preferred grouping or in a unique font: for example, in a green font or with a green-font marker, signifying a traffic signal "go" signal-type directive to the candidate, to convey an inherent recommendation that the candidate choose one of this "green" subset grouping;

(b.) the top-trending jobs having career path viability and/or future career progression values or some composite value determined therefrom within a middle third of all determined values are displayed in another different distinctive format or grouping relative to the remainder others: for example, in yellow font or with a yellow-font marker, signifying a traffic signal "caution" signal-type directive to the candidate, thereby inherently indicating that while any of these options are minimally viable, they are not as highly recommended or likely to be achieved as any within the top-third, "green" grouping; and (c.) the top-trending jobs having career path viability and/or future career progression values or some composite value determined therefrom within the bottom third of all determined values are displayed in another different distinctive format or grouping relative to the remainder others: for example, in red font or with a red-font marker, signifying a traffic signal "stop" signal-type directive to the candidate, inherently conveying a recommendation that the candidate choose another option within either of the "green" or "yellow" groupings, or otherwise that options within the "red" grouping should be considered as least-favored relative to the other groupings.

FIG. 2 illustrates a system (device) method or process embodiment of the present invention for dynamic career path selection and implementation responsive to embedded candidate data. In response to selection at 302 by a candidate (user) of one of top-trending career path jobs presented ranked (filtered) as potential career paths as function of career path viability and/or future career progression values or composite values thereof (as described above with respect to FIG. 1 at 216), at 304 a processor configured according to the present invention (the "configured processor") identifies one or more dimensional values that are required for qualifying for employment in the selected career path job and missing from the dimensional values of the embedded instantiation of the candidate within the Skills Metadata Repository 205 (as described above with respect to FIG. 1 at 210).

For example, the candidate may select "software architect" at 302 as a desired change in career from a current position of "software programmer," wherein at 304 the configured processor determines that software architect jobs in current market conditions generally require five years of Python programming experience, and that the candidate has only have two years of Python experience, resulting identification that the candidate will need to acquire three more effective years of programming experience in Python, and which may be met by acquiring additional college credits over that time, or within a shorter, two-year period if it leads to a degree certification specific to Python.

At 306 the configured processor identifies career path viability values determined for candidate for selected career path job that are variable as a function of revision to candidate dimensional values. For example, acquiring a new job as "software architect" may have a first, higher likelihood or viability value for similar set of skill dimension values if the candidate changes her current residency dimensional value from City A to City B, due to a much more robust market demand for software architects in City B (a higher percentage of open job offers that match the requisite skill set).

At 308 the configured processor presents estimated timeline for qualifying for selected career path job including missing skills ranked/prioritized as to achievement cost(s), and alternate career path viability values associated to revised candidate dimensional values. The presented timeline is a configurable schedule that displays target dates or milestones for achievement goals to get the requisite skills or otherwise maintain progress toward acquiring the desired job. Generally the configured processor at 308 presents missing dimensional values identified at 304 and alternative value options identified at 306 by prioritizing the values that have the greatest cost in time, monetary expense or difficulty in effort over other values easier to acquire (accomplish), thereby inherently focusing the candidate on the most important requirements for succeeding in the new career path chosen at 302.

In the present example discussed thus far, at 308 the configured processor generates a presentation on a graphical user interface (GUI) display of a personal device of the candidate (user) that prioritizes acquiring a two-year degree in Python from "ONLINE UNIVERSITY X," and indicates the total of the estimated tuition and other costs required to earn the degree, over another, alternative option determined at 304 of gaining three more years of Python programming experience in a current job of the candidate (wherein the configured processor indicates that the cost of the college degree will be offset by increased earning power by gaining the necessary credentials one year earlier); the presentation also displays the options in association with a yellow-font statement (or yellow-colored icon) informing the candidate that this option is based on the candidate remaining in her current residence of City A, and in association with a green-font statement (or green-colored icon) informing the candidate that this option is more likely to be successfully acquired if the candidate changes her current residence to City B by the time of application for the new job (as determined at 306).

At 310, in response to a selection of one of the prioritized, missing skill or revised, alternative dimensional values presented at 308, the configured processor opens an Application Programming Interface (API) application, program or service to offer goods or services to satisfy the selection. For example, in response to selection of the two-year degree option in Python from "ONLINE UNIVERSITY X," the configured processor opens, navigates by browser application to, or evokes an online portal to apply to ONLINE UNIVERSITY X, optionally automatically filing in identification and other information from the candidate dimensional data within the portal fields; and in response to selection by the candidate at 310 of the green-font statement or green-colored icon, the configured processor opens, navigates by browser application to, or evokes an online portal to apply to a realtor within City B for securing relocation services, starting search for residence rental inquiries, etc.

Thus, the API functions within 310 enable service providers providing embodiments of the present invention to monetize or otherwise directly realize income from services provided to the candidate in association with the selection at 310, via commissions, advertising revenue, fees, etc.

At 312 the configured processor determines whether the timeline estimated at 308 needs to be updated responsive to acquisition of missing skills or revised candidate dimensional values, via services rendered or completed through the API processes at 310, or in response to ad-hoc user inputs of completions of milestones or target dates of the timeline generated at 308, wherein the configured processor updates the timeline progression accordingly to reflect milestones achieved (for example, the candidate inputs completion of two of the three years of Python coursework, along with two concurrent years of experience on a specific Python programming project, which may be interpreted by the configured processor as meeting the three-year Python requirement needed to be a software architect).

Thus, embodiments of the present invention solve problems in conventional career planning: rather than require a user to choose between possible career paths based on the user's perception of the current and future marketplace demands, embodiments autonomously suggest possible career paths (represented internally by hypothetical job positions), with estimated timeframes for achieving them, based on behavioral and skillset sought by registered companies from analyzed current user information (knowledge, skills, interests), wherein a multi-agent composition of parallel execution of machine learning processes then classify to which paths (hypothetical jobs) a current user job status is closest to (based on dimensional data similarities), generating a holistic career path distribution analysis as a function of embedded data.

Rather than requiring candidates to decide on a career change based on incomplete data, and creating associated anxiety and worry, embodiments autonomously identify closest career paths (hypothetical jobs) regardless of different industries or backgrounds reflected in the dimensional data, and are thereby enabled to find career paths that are a best fit for the user even though not directly tied to candidate skillset, past experiences or preconceptions of the candidate as to what their career path should include.

Conventional career planning systems rely on candidates to provide inputs of desired or past positions in order to derive or suggest possible career paths. In contrast, embodiments of the present invention use machine learning processes to identify career growth opportunities for a candidate as a function of comparing the dimensional data of skills meta representation (instantiation) of the candidate to dimensional data of other candidates stored within the Skills Metadata Repository 205, wherein the dimensional data may be only indirectly related to the identified updates, and thereby undiscoverable under conventional career planning mechanisms. By using machine learning structures applied to big data encompassing current market needs and trends performing cross field analysis against pre-loaded information inclusive of skills and past work experiences, embodiments autonomously perform cross-referenced mapping focused on skillsets plus experiences, associated with estimated timeframes for achieving them, based on behavioral and skillset sought by registered companies from analyzed current user information (knowledge, skills, interests).

Conventional HR career planning services may fail to offer consistent levels of service, quality or accuracy with respect to projecting future employment demands and salary levels across different technical fields, in part due to inequalities in availability or quality of relevant employment data or business intelligence or across differing career areas. In contrast, via clustering values or recognizing other commonalities in geolocation dimensional data (for example, common geographic region, or within different geographic regions that share demographic similarities (percentages of college graduates with similar degree, or of candidates with similar job descriptions and salary ranges, etc.)) that is extracted from candidate mobile phones or governmental reporting data (tax or visa filings, etc.), embodiments may determine confidence of match of a candidate to the skills, salaries, etc. of other candidates that have successfully transitioned to a new, selected top-trending job, wherein the shared dimensional value may bear no direct relation to credentials qualifying a candidate for the new job, and thereby go entirely unconsidered under conventional processes.

Conventional HR career planning systems and processes are generally costly in proportion to the number of candidates serviced or managed, resulting in larger costs for scaling-up to meet the needs of increased numbers of candidates. In contrast, aspects of the present invention provide advantages over conventional processes. The machine learning aspects of the embodiments described above learn associations of candidate skills data that might seem disparate or otherwise unrelated to other values present within other candidate dimensional data that is determined to be advantageous in securing new employment, salary raises, etc., in a rapid, autonomous fashion that conventional HR career planning systems would fail to recognize. By generating multi-class outputs that identify clustered data values associated with desirable, top-trending job classifications within dimensional data, aspects may rapidly and autonomously prioritize suggested or automated dimensional value recommendations and acquisitions (job experiences, educational specific, geographic locations or opportunities, etc.), to focus on the ones that provide the greatest likelihood of career advancement.

Moreover, the processes of learning top-trending subsets of job classifications within dimensional data values that have better salary or career opportunities relative to remainder others (at 216, FIG. 1) and presenting prioritized missing skills for qualifying for selected career path job and alternate career path viability values associated to revised candidate dimensional values (at 308, FIG. 2) reduce dimensional data considered in an inherent, or overt, filtering process, and embodiments thereby provide computer system data processing and other cost efficiency advantages over conventional HR career planning systems and processes.

Aspects of the present invention include systems, methods and computer program products that implement the examples described above. A computer program product may include a computer-readable hardware storage device medium (or media) having computer-readable program instructions thereon for causing a processor to carry out aspects of the present invention.

FIG. 3 is a schematic, graphic illustration of an embodiment of a system 100 for autonomous career planning processes pursuant to the processes or systems of FIG. 1 or FIG. 2. The system 100 includes one or more local computing devices 102, such as, for example, a desktop computer 102a or smartphone 102b, or a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In the present example the smartphone 102b transfers (provides) candidate career path selection and milestone achievement data 104 over a network 108 to a computer server 110 via their respective network interface adapters 112b and 112c. The computer server 110 includes a processor 122 configured (thus, the "configured processor" discussed above with respect to FIGS. 1 and 2) with instructions stored in a memory 124. The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer readable memory 126 and a computer readable storage medium 128.

The computer server 110, in response to receiving the candidate data 104, interacts with or updates the skills dimension data stored in the Repository 205 in the various processes described above with respect to FIGS. 1 and 2, including exporting generated data 120 over the network 108 to the local computing device 102a via their respective network interface adapters 112c and 112a. The local computing devices 102 include one or more input devices 118, such as a keyboard, mouse, microphone, touch screen, etc., and wherein the processors 114a and 114b drive respective display devices 116a and 116b to generate and display at least a portion of the exported data 120.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112a, 112b and 122c in each device receives computer readable program instructions from the network 108 and forward the computer readable program instructions, including for storage in the computer readable storage medium 128.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as JAVA, Javascript®, C, C #, C++, Python, Cython, F #, PHP, HTML, Ruby, and the like. (JAVASCRIPT is a trademark of Oracle America, Inc., in the United States or other countries.)

The computer readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer readable program instructions to perform the processes described above.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one aspect, a service provider may perform process steps of the invention on a subscription, advertising, and/or fee basis. That is, a service provider could offer to integrate computer-readable program code into the computer system 100 to enable the computer system 100 to perform the processes of FIGS. 1 through 3 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by one or more processors coupled with memory, current data and historic data associated with a unique data object, wherein the current data and the historic data are in an unstructured data format;

extracting, by the one or more processors, data values from the current data and the historic data;

generating, by the one or more processors, confirmed data values by performing disambiguation processes on the data values and by selecting semantic meanings of text of the data values from a plurality of possible meanings of word content as a first function of context of the data values;

mapping, by the one or more processors, the confirmed data values to data elements of a first metadata structure of a plurality of metadata structures, based on the confirmed data values matching one or more of the data elements of the first metadata structure, wherein each of the plurality of metadata structures are in a unified data format, and wherein the data elements of the first metadata structure include a title;

executing, by the one or more processors, a machine learning process by inputting the first metadata structure to the machine learning process, wherein the machine learning process compares the first metadata structure to the plurality of metadata structures to identify a subset of metadata structures of the plurality of metadata structures based on i) the data elements of each of the subset of metadata structures including values greater than the data elements of a remainder of the plurality of metadata structures, and ii) the data elements of each of the subset of metadata structures being similar to the data elements of the first metadata structure, and wherein each of the subset of metadata structures include a unique title different from the title of the first metadata structure;

determining, by the one or more processors, a viability value for each of the subset of metadata structures as a second function of strength of match the data elements of the first metadata structure to the data elements of each of the subset of metadata structures, wherein the greater the viability value, the greater a quantity of the data elements are shared by the first metadata structure and a respective metadata structure of the subset of metadata structures;

generating, by the one or more processors, a digital twin of the first metadata structure using principal component analysis (PCA) to perform a dimensionality reduction of the data elements of the first metadata structure, clustering the data elements of the first metadata structure with the data elements of the subset of metadata structures, wherein the PCA transforms the data elements of the first metadata structure into a set of linearly uncorrelated principal components;

executing, by the one or more processors, the digital twin of the first metadata structure in a simulated scenario of each of the subset of metadata structures to determine a progression value for each of the subset of metadata structures at an end of a time period;

determining, by the one or more processors, composite values for the subset of metadata structures based on the viability value and the progression value;

identifying, by the one or more processors, a first group including metadata structures of the subset of metadata structures including the composite values in a top third of all the composite values, a second group including the metadata structures of the subset of metadata structures including the composite values in a middle third of all the composite values, and a third group including the metadata structures of the subset of metadata structures including the composite values in a bottom third of all the composite values;

providing, by the one or more processors, the unique title of each of the metadata structures of the first group, the second group, and the third group for display using a graphical user interface, wherein the unique title of each of the metadata structures of the first group are displayed with a first font and a first color to indicate that the metadata structures of the first group are recommended for the unique data object, and wherein the unique title of each of the metadata structures of the second group and the third group are displayed in a font different from the first font and a color different from the first color to indicate that the metadata structures of the second group and the third group are not as recommended as the metadata structures of the first group;

receiving, by the one or more processors, a selection via the graphical user interface of a metadata structure of the first group having the unique title displayed with the first font and the first color; and automatically navigating, by the one or more processors, in response to the selection via the graphical user interface associated with the first color, to a browser to provide access to an application associated with the selection.

2. A system, comprising:

a processor;

a computer readable memory in circuit communication with the processor;

a computer readable storage medium in circuit communication with the processor;

wherein the processor executes program instructions stored on the computer readable storage medium via the computer readable memory and thereby:

receives current data and historic data associated with a unique data object, wherein the current data and the historic data are in an unstructured data format;

extracts data values from the current data and the historic data;

generates confirmed data values by performing disambiguation processes on the data values and by selecting semantic meanings of text of the data values from a plurality of possible meanings of word content as a first function of context of the data values;

maps, the confirmed data values to data elements of a first metadata structure of a plurality of metadata structures, based on the confirmed data values matching one or more of the data elements of the first metadata structure, wherein each of the plurality of metadata structures are in a unified data format, and wherein the data elements of the first metadata structure include a title;

executes a machine learning process by inputting the first metadata structure to the machine learning process, wherein the machine learning process compares the first metadata structure to the plurality of metadata structures to identify a subset of metadata structures of the plurality of metadata structures based on i) the data elements of each of the subset of metadata structures including values greater than the data elements of a remainder of the plurality of metadata structures, and ii) the data elements of each of the subset of metadata structures being similar to the data elements of the first metadata structure, and wherein each of the subset of metadata structures include a unique title different from the title of the first metadata structure;

determines a viability value for each of the subset of metadata structures as a second function of strength of match the data elements of the first metadata structure to the data elements of each of the subset of metadata structures, wherein the greater the viability value, the greater a quantity of the data elements are shared by the first metadata structure and a respective metadata structure of the subset of metadata structures;

generates a digital twin of the first metadata structure using principal component analysis (PCA) to perform a dimensionality reduction of the data elements of the first metadata structure, clustering the data elements of the first metadata structure with the data elements of the subset of metadata structures, wherein the PCA transforms the data elements of the first metadata structure into a set of linearly uncorrelated principal components;

executes the digital twin of the first metadata structure in a simulated scenario of each of the subset of metadata structures to determine a progression value for each of the subset of metadata structures at an end of a time period;

determines composite values for the subset of metadata structures based on the viability value and the progression value;

identifies a first group including metadata structures of the subset of metadata structures including the composite values in a top third of all the composite values, a second group including the metadata structures of the subset of metadata structures including the composite values in a middle third of all the composite values, and a third group including the metadata structures of the subset of metadata structures including the composite values in a bottom third of all the composite values;

provides the unique title of each of the metadata structures of the first group, the second group, and the third group for display using a graphical user interface, wherein the unique title of each of the metadata structures of the first group are displayed with a first font and a first color to indicate that the metadata structures of the first group are recommended for the unique data object, and wherein the unique title of each of the metadata structures of the second group and the third group are displayed in a font different from the first font and a color different from the first color to indicate that the metadata structures of the second group and the third group are not as recommended as the metadata structures of the first group;

receives a selection via the graphical user interface of a metadata structure of the first group having the unique title displayed with the first font and the first color; and automatically navigates, in response to the selection via the graphical user interface associated with the first color, to a browser to provide access to an application associated with the selection.

3. A computer program product, comprising:

a computer readable storage medium having computer readable program code embodied therewith, wherein the computer readable storage medium is not a transitory signal per se, the computer readable program code comprising instructions for execution by a processor that cause the processor to:

receive current data and historic data associated with a unique data object, wherein the current data and the historic data are in an unstructured data format;

extract data values from the current data and the historic data;

generate confirmed data values by performing disambiguation processes on the data values and by selecting semantic meanings of text of the data values from a plurality of possible meanings of word content as a first function of context of the data values;

map the confirmed data values to data elements of a first metadata structure of a plurality of metadata structures, based on the confirmed data values matching one or more of the data elements of the first metadata structure, wherein each of the plurality of metadata structures are in a unified data format, and wherein the data elements of the first metadata structure include a title;

execute a machine learning process by inputting the first metadata structure to the machine learning process, wherein the machine learning process compares the first metadata structure to the plurality of metadata structures to identify a subset of metadata structures of the plurality of metadata structures based on i) the data elements of each of the subset of metadata structures including values greater than the data elements of a remainder of the plurality of metadata structures, and ii) the data elements of each of the subset of metadata structures being similar to the data elements of the first metadata structure, and wherein each of the subset of metadata structures include a unique title different from the title of the first metadata structure;

determine a viability value for each of the subset of metadata structures as a second function of strength of match the data elements of the first metadata structure to the data elements of each of the subset of metadata structures, wherein the greater the viability value, the greater a quantity of the data elements are shared by the first metadata structure and a respective metadata structure of the subset of metadata structures;

generate a digital twin of the first metadata structure using principal component analysis (PCA) to perform a dimensionality reduction of the data elements of the first metadata structure, clustering the data elements of the first metadata structure with the data elements of the subset of metadata structures, wherein the PCA transforms the data elements of the first metadata structure into a set of linearly uncorrelated principal components;

execute the digital twin of the first metadata structure in a simulated scenario of each of the subset of metadata structures to determine a progression value for each of the subset of metadata structures at an end of a time period;

determine composite values for the subset of metadata structures based on the viability value and the progression value;

identify a first group including metadata structures of the subset of metadata structures including the composite values in a top third of all the composite values, a second group including the metadata structures of the subset of metadata structures including the composite values in a middle third of all the composite values, and a third group including the metadata structures of the subset of metadata structures including the composite values in a bottom third of all the composite values;

provide the unique title of each of the metadata structures of the first group, the second group, and the third group for display using a graphical user interface, wherein the unique title of each of the metadata structures of the first group are displayed with a first font and a first color to indicate that the metadata structures of the first group are recommended for the unique data object, and wherein the unique title of each of the metadata structures of the second group and the third group are displayed in a font different from the first font and a color different from the first color to indicate that the metadata structures of the second group and the third group are not as recommended as the metadata structures of the first group;

receive a selection via the graphical user interface of a metadata structure of the first group having the unique title displayed with the first font and the first color; and automatically navigate, in response to the selection via the graphical user interface associated with the first color, to a browser to provide access to an application associated with the selection.

4. The method of claim 1, comprising:

receiving, by the one or more processors, an indication of a selection of a first unique title of a second metadata structure of at least one of the first group, the second group, and the third group;

identifying, by the one or more processors, responsive to the selection, a plurality of data elements that are included in the data elements of the second metadata structure and missing from the data elements of the first metadata structure;

determining, by the one or more processors, a plurality of viability values for the second metadata structure as a third function of changes to the plurality of data elements; and providing, by the one or more processors, a list comprising the plurality of data elements for display using the graphical user interface, wherein the plurality of data elements of the list are ranked based on the plurality of viability values.

5. The system of claim 2, comprising:

receives an indication of a selection of a first unique title of a second metadata structure of at least one of the first group, the second group, and the third group;

identifies, responsive to the selection, a plurality of data elements that are included in the data elements of the second metadata structure and missing from the data elements of the first metadata structure;

determines a plurality of viability values for the second metadata structure as a third function of changes to the plurality of data elements; and provides a list comprising the plurality of data elements for display using the graphical user interface, wherein the plurality of data elements of the list are ranked based on the plurality of viability values.

6. The computer program product of claim 3, wherein the computer readable program code instructions for execution by the processor further cause the processor to:

receive an indication of a selection of a first unique title of a second metadata structure of at least one of the first group, the second group, and the third group;

identify, responsive to the selection, a plurality of data elements that are included in the data elements of the second metadata structure and missing from the data elements of the first metadata structure;

determine a plurality of viability values for the second metadata structure as a third function of changes to the plurality of data elements; and provide a list comprising the plurality of data elements for display using the graphical user interface, wherein the plurality of data elements of the list are ranked based on the plurality of viability values.

* * * * *